INVENTOR.
CLIFFORD B. CORDY JR.

United States Patent Office 3,529,228
Patented Sept. 15, 1970

3,529,228
LOW LOSS CAPACITOR CHARGING CIRCUIT
Clifford B. Cordy, Jr., Granada Hills, Calif., assignor to Korad Corporation, a corporation of New York
Filed July 8, 1966, Ser. No. 563,765
Int. Cl. H02n *3/32;* G05f *1/56, 1/68*
U.S. Cl. 320—1                    4 Claims

ABSTRACT OF THE DISCLOSURE

A low loss resonant type capacitor charging circuit using a DC to DC converter is provided with an additional capacitor of considerably smaller value than the capacitor to be charged. This additional capacitor is coupled through a rectifying means in the form of a diode bridge to the input of an inductor to define a resonant circuit with the inductor for providing a charging current. The small additional capacitor is charged resonantly through the inductor in the circuit on each half cycle of the chopper frequency and in this respect the inductor need not be large. The value of the additional capacitor and the inductor are selected so that the capacitor charges in considerably less time than half the period of the chopper frequency. After the small additional capacitor is charged each time, current continues to flow through the diode bridge to the main capacitor to be charged thus further charging this capacitor.

---

Figure 1:
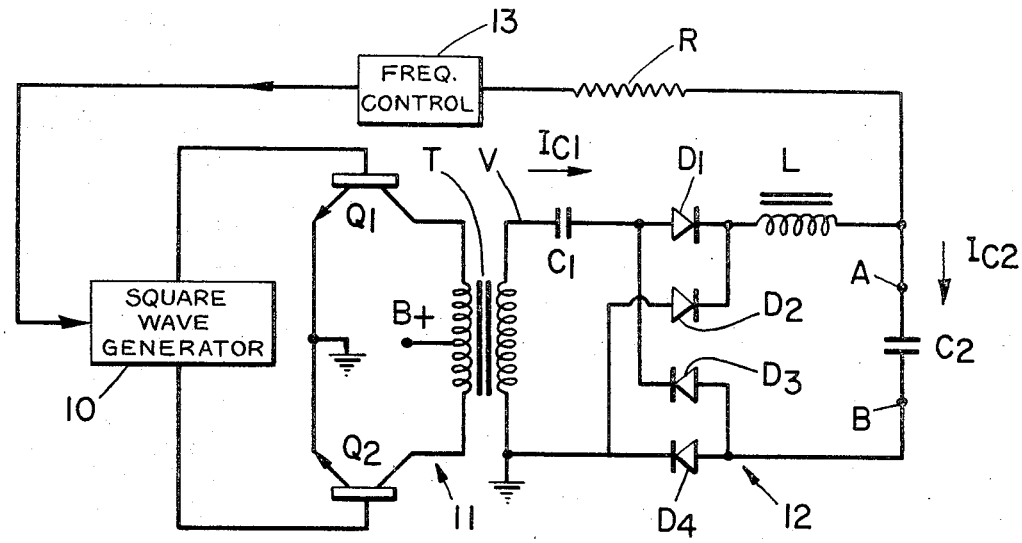

This invention relates generally to capacitor charging circuits and more particularly to an improved low loss charging circuit for storing high voltages on a capacitor in a relatively short period of time.

Charging of a capacitor by simply closing a voltage source across the capacitor results in half the energy being wasted during the charging process. To overcome this waste, there have been provided heretofore resonant charging circuits wherein an inductor is provided in series with the capacitor to be charged. The inductor and capacitor define a resonant circuit and by blocking reverse current flow, the capacitor can be charged with substantially no loss. However, the peak energy stored in the inductor is one quarter of the final energy to be stored in the capacitor. Thus, if more than a few joules are to be stored on the capacitor, a very large inductor is required.

Normally a DC to DC type converter in the form of a square wave generator and chopper circuit is employed to provide a voltage source to charge the capacitor. The use of the converter is convenient since it requires only a small source voltage. In addition, the provision of the converter avoids the necessity of a large inductor. This is accomplished by running the chopper at a very low duty cycle wherein each side of the chopper is on for considerably less than half the period of the chopper, the current flowing in the inductor continuing to flow while the chopper is off. As the voltage on the capacitor increases, the duty cycle is increased.

Even with the foregoing system, there are disadvantages. First, the switching transistors making up the chopper portion of the circuit must turn off against high currents flowing into the transformer. Second, part of the current in flowing in the transformer results in the generation of larger voltage spikes on the chopper when the duty cycle is low than would be generated with each half of the chopper being on half the time.

With the above in mind, it is a primary object of the present invention to provide a low loss capacitor charging circuit in which the foregoing problems are overcome.

More particularly, objects of this invention are to provide a resonant type charging circuit for storing large charges on a capacitor in a relatively short time wherein, first, the inductor need not be large; second, the duty cycle of any chopper employed may be kept on half the time and off half the time to minimize voltage spikes; and third, the switching transistors switch under a no load current condition.

Briefly, these and other objects and advantages of this invention are attained by providing, in a low loss resonant type capacitor charging circuit using a DC to DC converter, an additional capacitor of considerably smaller valve than the capacitor to be charged. This additional capacitor is coupled through a rectifying means in the form of a diode bridge to the input of the inductor to define a resonant circuit with the inductor for providing a charging current. The small additional capacitor is charged resonantly through the inductor in the circuit on each half cycle of the chopper frequency and in this respect the inductor need not be large. The value of the additional capacitor and the inductor are selected so that the capacitor charges in considerably less time than half the period of the chopper frequency. After the small additional capacitor is charged each time, current continues to flow through the diode bridge to the main capacitor to be charged thus further charging this capacitor.

Since the resonant charging of the smaller capacitor takes place in considerably less than half the period of the chopper frequency, the switching transistors providing the chopping action switch under zero or no load conditions. Further, by operating the chopper so that it is on and off for equal times, voltage spikes are minimized.

An additional feature of this invention, although not required, is to provide an automatic frequency control means which will increase the chopping rate of the chopper with increasing voltage on the capacitor to be charged. By this arrangement, the average current in the inductor can be maintained at a high value so that the overall charging time is decreased.

Figure 2:
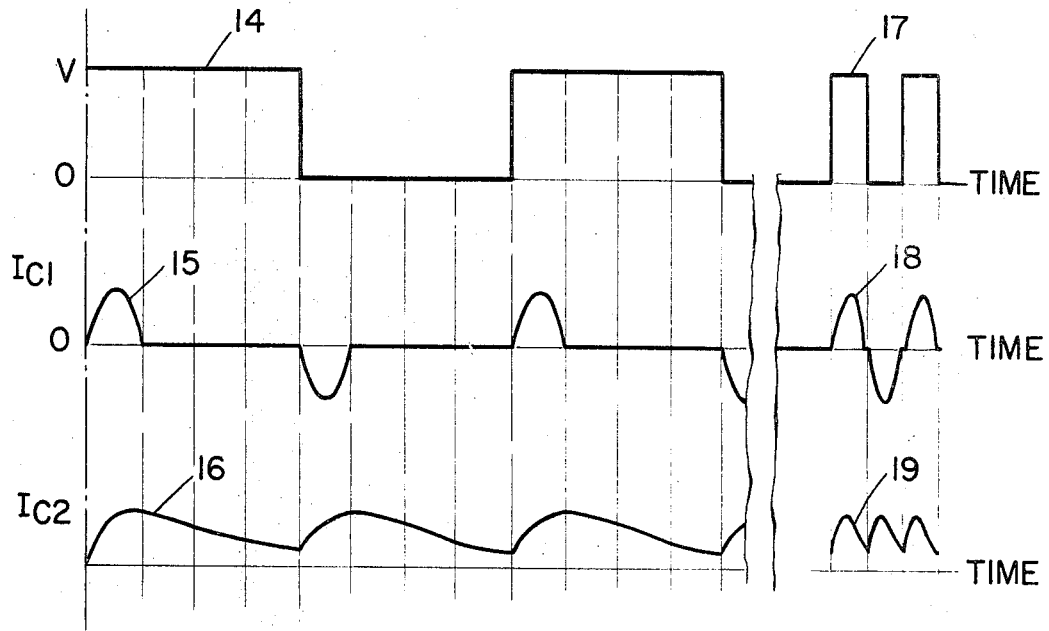

A better understanding of the invention will now be had by referring to a preferred embodiment illustrated in the accompanying drawings, in which:

FIG. 1 is a schematic circuit diagram partly in block form illustrating the low loss capacitor charging circuit of this invention; and, FIG. 2 illustrates various voltage and current wave forms useful in explaining the operation of the invention.

Referring first to FIG. 1 there is shown an alternating voltage generating means which includes a square wave generator 10 coupled to chopper circuit 11 comprised of first and second switching transistors Q1 and Q2. In the embodiment illustrated, the emitters are common and connected to ground and the collectors are connected across the primary of a transformer T. A DC voltage is applied to a center tap on the primary end of the transformer as indicated at B+. The base terminals of the transistors connect to the output of a square wave generator 10, such as a multi-vibrator.

The secondary coil of the transformer T connects to a first capacitor C1. The other side of this capacitor C1 connects through a rectifying means 12 in the form of a diode bridge comprised of diodes D1, D2, D3, and D4, to the input of an inductor L. The other side of the inductor L connects to terminal A of a terminal means, A and B, adapted to be connected across a capacitor C2 to be charged.

The other terminal B connects through the rectifying means 12 back to the other side of the secondary coil of the transformer T which is grounded as indicated.

The diode bridge blocks current flow from the capacitor C2 in a direction back through the inductor I so that any charge placed on the capacitor is held on the capacitor.

As a specific application of the present invention, the capacitor C2 may constitute the capacitor in a light pump system for a laser.

The circuit of FIG. 1 may also, but not necessarily, include a frequency control 13 having one side coupled through a high resistance R to the terminal A so that it senses the voltage on the capacitor C2 and its other side connected to the square wave generator 10. This frequency control functions to vary the frequency of the square wave generator and thus the chopping frequency of the chopper 11 as a function of the voltage stored on the capacitor C2.

Referring now to both FIGS. 1 and 2, the operation of the circuit will be described.

With the square wave generator 10 operating, the base terminals of the transistors Q1 and Q2 are alternately supplied with positive voltages to switch these transistors on and off. This alternate switching of transistors Q1 and Q2 results in an output square wave at the secondary of the transformer T. If the transformation ratio of the transformer T is 1:1, the peak amplitude of the output square wave, designated V, will be twice the battery or B+ voltage supplied to the chopper. This output wave form is illustrated in the top graph of FIG. 2 at 14.

The capacitor C1 is charged resonantly through the inductor L on each half cycle of the chopper frequency. The charging current in C1 is indicated by 1CE and depicted by the current wave form 15 in the second graph of FIG. 2. It will be noted that the charging time for C1 takes place in considerably less time than half the period of the chopper frequency.

After C1 is charged, current continues to flow through the diode bridge to C2 thus further charging C2. The current passing through the inductor L to C2 is indicated by IC2 and is illustrated in the third graph of FIG. 2 at 16. As C2 charges, the rate of decrease of current in L decreases more rapidly as will be evident from the end portions of the wave forms in FIG. 2.

By increasing the chopping frequency or rate of the chopper, the average current value in L can be maintained at a high value as the charge on the condensor C2 approaches the required charge value. This will be evident by referring to the right hand portions of the curves of FIG. 2 beyond the break in the time line which indicates conditions at 17, 18, and 19 when the frequency of the chopper is increased. Thus, with increased frequency of chopper output, a higher average current condition is maintained in the inductor at 19. It will be understood that when the automatic frequency control is used, the frequency of the chopper is increased uniformly with increasing voltage on the capacitor C2.

In an actual prototype of this circuit, charging rates of up to 300 joules per second were achieved with efficiencies as high as 80 to 90%.

From the foregoing description, it will thus be evident that a low loss capacitor charging circuit has been provided wherein the transistors defining the chopper portion of the circuit switch under no load conditions since no current is flowing in the secondary at the switching times. In addition a large inductor is not required even though the final energy to which the capacitor is to be charged is of a relatively high value.

While only one particular embodiment has been shown and described, various equivalent circuit components may be substituted without departing from the scope and spirit of this invention.

What is claimed is:

1. A low loss capacitor charging circuit comprising, in combination: an alternating voltage generating means; a first capacitor having one side connected to said alternating voltage generating means; an inductor; rectifying means connected between the other side of said first capacitor and one side of said inductor; and terminal means adapted to be connected to a second capacitor to be charged, the other side of said inductor connecting to said terminal means so that said inductor is in series with said second capacitor when said terminal means are connected to said second capacitor, said first capacitor and inductor defining a resonant circuit of given period for providing charging current for said second capacitor, said alternating voltage generating means comprising a square wave generator and a chopper circuit including switching means connected to said square wave generator, and an output transformer for providing a square wave output to said first capacitor, said given period being less than the period of said square wave output such that said switching means switch at a time when no load current is presently in said transformer.

2. A circuit according to claim 1, including frequency control means connected between said terminal means and said square wave generator and responsive to increasing voltage built up on said second capacitor as it is being charged to increase the frequency of said square wave generator such that its period decreases to a value approaching said given period whereby the average current in said inductor is maintained at a relatively high value to minimize the charging time of said second capacitor.

3. A circuit according to claim 2, in which said rectifying means comprises a diode bridge circuit blocking current flow from said terminal means back through said inductor.

4. A circuit according to claim 2, in which said switching means comprise first and second switching transistors.

References Cited

UNITED STATES PATENTS

| | | | |
|---|---|---|---|
| 3,219,906 | 11/1965 | Keller et al. | 321—16 |
| 3,300,656 | 1/1967 | Meier et al. | 320—1 X |
| 3,354,379 | 11/1967 | Swain et al. | 321—15 |

BERNARD KONICK, Primary Examiner

J. F. BREIMAYER, Assistant Examiner

U.S. Cl. X.R.

315—244; 321—2, 15

UNITED STATES PATENT OFFICE
CERTIFICATE OF CORRECTION

Patent No. 3,529,228                                  September 15, 1970

Clifford B. Cordy, Jr.

It is certified that error appears in the above identified patent and that said Letters Patent are hereby corrected as shown below:

In the heading to the printed specification, lines 3 and 4, "assignor to Korad Corporation, a corporation of New York" should read -- assignor to Union Carbide Corporation, a corporation of New York --.

Signed and sealed this 30th day of March 1971.

(SEAL)
Attest:

EDWARD M. FLETCHER, JR.                        WILLIAM E. SCHUYLER, JR.
Attesting Officer                                  Commissioner of Patents